(12) United States Patent
Guo

(10) Patent No.: US 11,412,822 B2
(45) Date of Patent: Aug. 16, 2022

(54) ADJUSTABLE LUGGAGE TRUNK STROLLER HAVING FOLDABLE SEAT

(71) Applicant: Tongsen Guo, Taipei (TW)

(72) Inventor: Tongsen Guo, Taipei (TW)

( * ) Notice: Subject to any disclaimer, the term of this patent is extended or adjusted under 35 U.S.C. 154(b) by 393 days.

(21) Appl. No.: 16/724,593

(22) Filed: Dec. 23, 2019

(65) Prior Publication Data

US 2020/0121044 A1 Apr. 23, 2020

Related U.S. Application Data

(62) Division of application No. 15/896,142, filed on Feb. 14, 2018, now Pat. No. 10,555,588.

(51) Int. Cl.
| | | |
|---|---|---|
| *A45C 9/00* | (2006.01) | |
| *A47C 4/52* | (2006.01) | |
| *A45C 5/14* | (2006.01) | |
| *A47C 9/10* | (2006.01) | |
| *B62B 7/00* | (2006.01) | |

(52) U.S. Cl.
CPC .................. *A45C 9/00* (2013.01); *A45C 5/14* (2013.01); *A47C 4/52* (2013.01); *A47C 9/10* (2013.01); *B62B 7/00* (2013.01); *A45C 2009/002* (2013.01); *A45C 2009/005* (2013.01)

(58) Field of Classification Search
CPC ................ A45C 9/00; A45C 2009/002; A45C 2009/005; A45C 5/14; A45C 5/145; A47C 4/52; A47C 9/10; B62B 7/00
USPC ............................................................ 190/8
See application file for complete search history.

(56) References Cited

U.S. PATENT DOCUMENTS

| | | | | |
|---|---|---|---|---|
| 10,238,195 | B2* | 3/2019 | Clarke | .................. A45C 13/262 |
| 2004/0021583 | A1* | 2/2004 | Lau | ..................... G01C 21/3617 |
| | | | | 701/418 |
| 2004/0066069 | A1* | 4/2004 | Caldana | .................. B62B 1/125 |
| | | | | 297/250.1 |
| 2012/0161408 | A1* | 6/2012 | Sidhu | ..................... A45C 13/28 |
| | | | | 280/47.38 |
| 2013/0111679 | A1* | 5/2013 | Engle | ................... A47L 11/4075 |
| | | | | 403/150 |
| 2015/0075933 | A1* | 3/2015 | Clarke | ................... A45C 5/146 |
| | | | | 190/8 |
| 2019/0142124 | A1* | 5/2019 | Murch | ................... A45C 5/146 |
| | | | | 190/18 R |

* cited by examiner

*Primary Examiner* — Sue A Weaver
(74) *Attorney, Agent, or Firm* — Demian K. Jackson; Jackson IPG PLLC

(57) ABSTRACT

An adjustable luggage trunk stroller with seat cushion is provided. The luggage trunk stroller has an innovative structure, comprising a casing, a rod assembly, a seat cushion and a seat belt. As comparing to the conventional structure, the casing can be manually rotated for changing the tilt angle of the casing at 0~90 degrees and fastened to a certain position with the coordination of the rod assembly. When disposing the casing at a certain angle, the seat cushion can be swayed and extended for an infant to sit. Or, when the casing is disposed in a horizontal planar state, the seat cushion can be swayed and folded for the infant to lie flat. Thus, the luggage trunk stroller is capable of carrying the infant during walking. The luggage and the infant can be carried at the same time for effectively improving the added value of the luggage trunk stroller.

8 Claims, 7 Drawing Sheets

ADJUSTABLE LUGGAGE TRUNK STROLLER HAVING FOLDABLE SEAT

TECHNICAL FIELD OF THE INVENTION

The present invention relates to a luggage trunk stroller with a seat cushion; more particularly, to carrying an infant or child together with luggage during walking.

DESCRIPTION OF THE RELATED ARTS

A carrying trunk with wheel is used to store clothes so that people can easily carry them for outing. Hence, it has become a must-have for traveling for business or leisure. The types and sizes of conventional trunks are various. But, no matter what kind of trunk is, it all has a luggage rack to provide simple storage of clothing, whose function is quite limited.

However, many travelers often feel inconvenient in mobility for carrying too much luggage, especially when they carry infants/kids with them. Because they have to carry baby strollers and other infant necessities, the items in the luggage are increased in number; and it becomes difficult to drag suitcases by one hand and push a stroller by the other hand. This makes those travelers struggling. Not only dilemma and inconveniences happen on using devices, but also physical burden increases, which results in a cumbersome and exhausting journey having infants/kids carried with.

Since the traditional trunks are inconvenient and limited in function, a few prior arts are revealed. However, they still have various disadvantages to be improved. One prior art of trunk requires an extra space for storing tabletop and table legs, which is not suitable for traveling while not only extra space is occupied but also the weight is increased. In some other prior art, the trunks cannot be separated with the seats, which increase weight and cause extra handling problems. Further, the above patents are all fixed at a certain point for sitting or lying, but there are no seat for an infant while carrying their luggage. Some luggage trunk strollers are revealed in those prior arts. A kind of luggage trunk strollers is disadvantaged in a shaky gravity center. Another kind of luggage trunk strollers has an unfold seat cushion pivoted at both ends of a side of a casing, which is relatively insufficient in structural strength. As long as the infant has a slightly heavier weight, the seat cushion may be easily broken, whose security is worthy of consideration. Still, another kind of luggage trunk strollers use single wheels to be inclined at an appropriate angle for carrying the seated infant. Because the heavy luggage and the infant are carried at the same time, the operation is laborious. Nevertheless, because the seat is set corresponding to the single wheel at bottom of the casing at another side surface, the infant's feet may easily touch the ground or be suspending for nowhere to place on.

Hence, the prior arts do not fulfill all users' expectations on actual use.

SUMMARY OF THE INVENTION

The main purpose of the present invention is to manually pivoting a casing of a luggage trunk stroller for changing a tilt angle at 0~90 degrees to be fastened at a certain position with the coordination of a rod assembly, where a seat cushion can be swayed and expanded for an infant to sit when the casing is disposed at a certain angle; the seat cushion can be swayed and folded for the infant to lie flat when the casing is disposed in a horizontal planar state; and, thus, the luggage trunk stroller can carry the infant and the luggage at the same time during walking.

To achieve the above purpose, the present invention is an adjustable luggage trunk stroller having a foldable seat, where the luggage trunk stroller comprises a rod assembly, a casing, a seat cushion and a seat belt; the rod assembly comprises a grasping part and two parallel sleeves; the grasping part has two ends separately sleeved in top ends of the parallel sleeves to be prolonged or shortened in length; the parallel sleeves are combined with a front wheel set at first bottom ends of the parallel sleeves; the parallel sleeves have two rotation pivots and two support rods at two sides of the parallel sleeves separately opposite to the casing; the support rods are disposed to the rotation pivots at second top ends of the support rods separately to be swayed with a center of the rotation pivots; the support rods are combined with a rear wheel set at second bottom ends of the support rods; the casing is combined with the rotation pivots of the parallel sleeves at two opposite sides of the casing; the casing is swayed with a center of the rotation pivots of the parallel sleeves to obtain a tilt angle; the seat cushion is pivotally connected to the casing; the seat cushion is swayed and extended to be used on a front surface of the casing or is swayed and folded to be disposed on a side of the casing; and the seat belt is obtained on the front surface of the casing to fasten and safeguard an infant. Accordingly, a novel adjustable luggage trunk stroller having a foldable seat is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1 to FIG. 4, which are views showing a first to a fourth states-of-use of a first preferred embodiment according to the present invention. As shown in the figures, the present invention is an adjustable luggage trunk stroller having a foldable seat, comprising a casing 1, a rod assembly 2, a seat cushion 3 and a seat belt 4.

Figure 1:
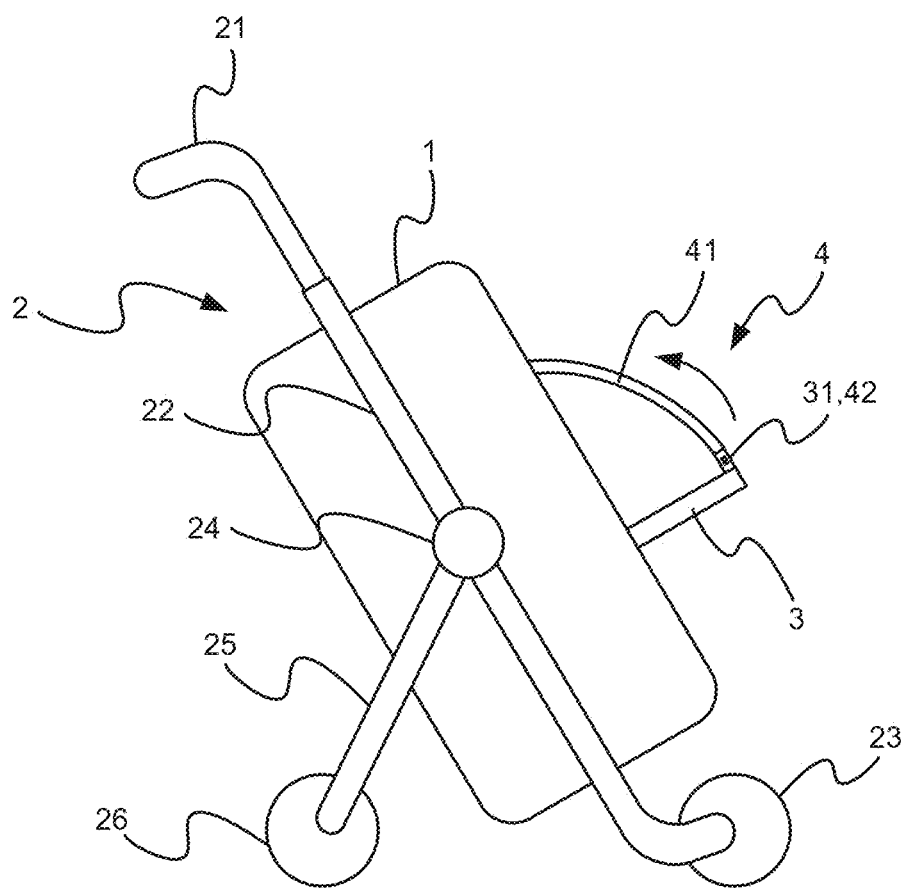
FIG. 1 is the view showing the first state-of-use of the first preferred embodiment according to the present invention.
Figure 2:
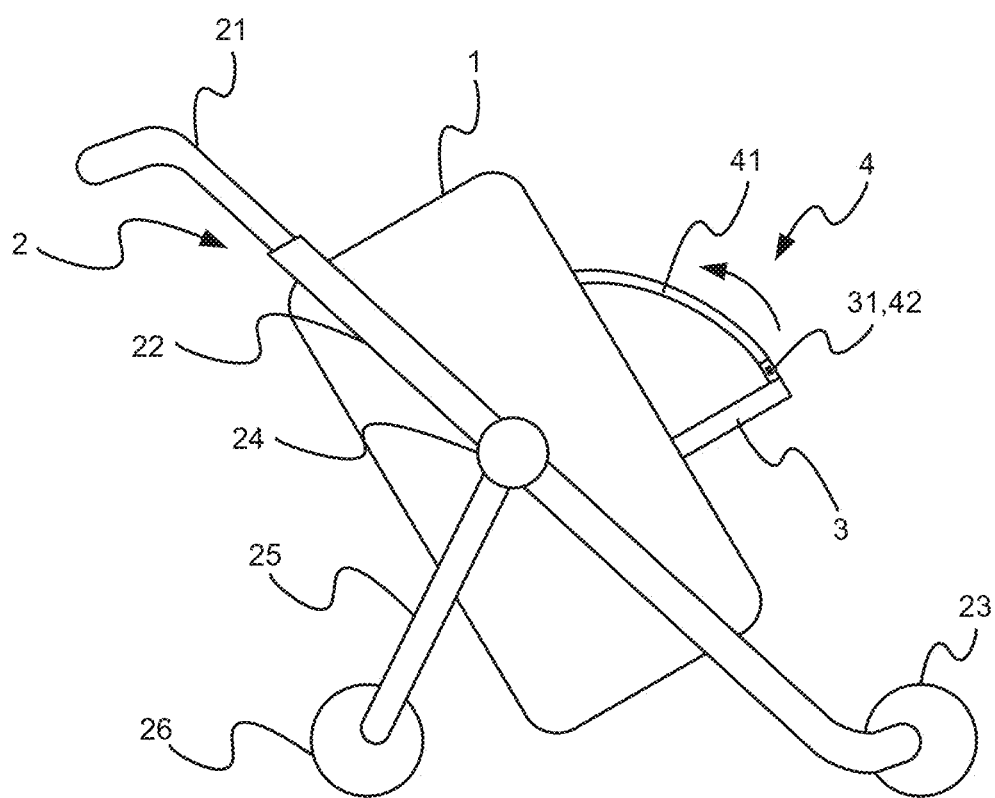
FIG. 2 is the view showing the second state-of-use of the first preferred embodiment.

In the first to the third states-of-use, as shown in FIG. 1, the rod assembly 2 comprises a grasping part 21 and two parallel sleeves 22; the grasping part 21 has two ends separately sleeved in top ends of the parallel sleeves 22 to be prolonged or shortened in length; the parallel sleeves 22 are combined with a front wheel set 23 at bottom ends; the parallel sleeves 22 have two rotation pivots 24 and two support rods 25 at two sides separately opposite to the casing 21; the support rods 25 are disposed to the rotation pivots 24 at top ends separately to be swayed with a center of the rotation pivots 24; and the support rods 25 are combined with a rear wheel set 26 at bottom ends. Furthermore, as shown in FIG. 2, the rotation pivots 24 are adjustable to adjust angles formed by propping between the parallel sleeves 22 and the support rods 25.

Figure 3:
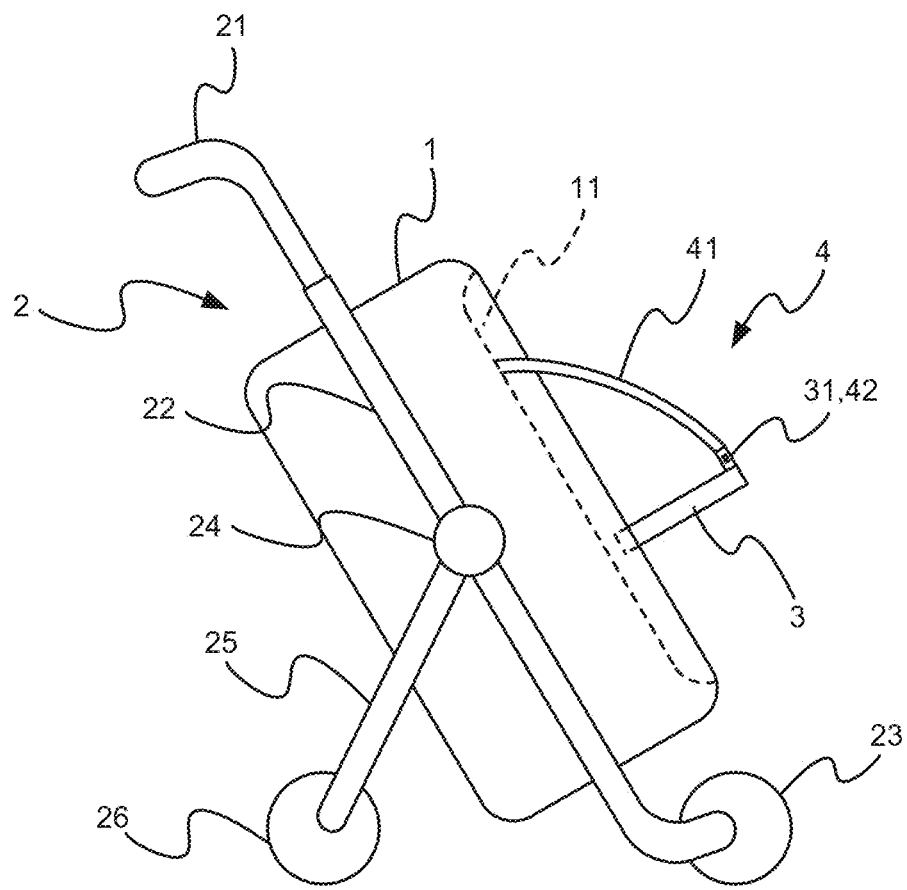
FIG. 3 is the view showing the third state-of-use of the first preferred embodiment.
Figure 4:
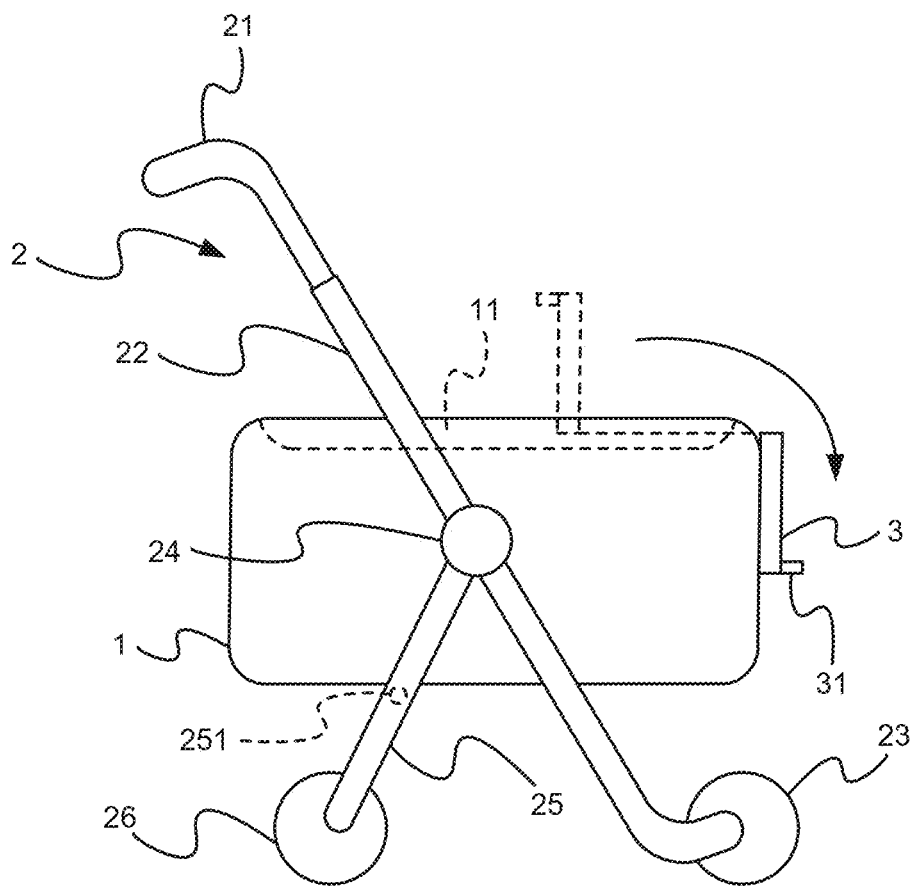
FIG. 4 is the view showing the fourth state-of-use of the first preferred embodiment.

The casing 1 is combined with the rotation pivots 24 of the parallel sleeves 22 at two opposite sides, so that the casing 1 can be swayed with a center of the rotation pivots 24 of the parallel sleeves 22 to obtain a tilt angle. For example, the support rods 25 has a fixing rod (or a positioning shaft) 251 to fix the tilt angle of the casing 1 swayed to 0~90 degrees, as shown in FIG. 3 and FIG. 4. The casing 1 can be rotated from a vertical state with a slightly tilt angle for an infant to sit on into a horizontal state for an infant to lie flat. The casing 1 has a holding depression 11 concaved in a front surface of the casing 1 where the seat cushion 3 is swayed up or down and folded to be held in the holding depression 11 or at bottom the casing 1.

The seat cushion 3 is pivotally connected to the casing 1, which is swayed and extended to be used on the front surface of the casing 1 or is swayed and folded to be disposed on a side of the casing 10. In a state-of-use, the seat cushion 3 is swayed and extended with a first joint 31 set at a side opposite to the casing 1.

The seat belt 4 is set on the front surface of the casing 1 to fasten and safeguard the infant. In a state-of-use, the seat belt 4 comprises at least two straps 41 and a second joint 42; first ends of the straps 41 are separately fixed at two sides on the front surface of the casing 1; second ends of the straps 41 are jointed to the second joint 42; and the second joint 42 is capable of being removed and fixed at the first joint 31. Therein, the seat cushion 3, the front surface of the casing 1 and the straps 41 form a holding space by fixing the second joint 42 to the first joint 31; and the holding space firmly holds the infant to be sat on the seat cushion 3 with the head of the infant between the straps 41 and the first joint 31 between the two legs of the infant. In another state-of-use, in addition to the seat belt 4, the casing 1 further has two connecting parts (not shown in the figures) at two corresponding sides of said casing as adhering to said seat cushion 3; each of the connecting parts has a strap at an end and a locking device at the other end; the straps of the connecting parts are combined with and fixed at the sides of the casing 1 separately; and the locking devices of the two connecting parts are connected with each other to wind around the waist of the infant and are detachable.

Figure 5:
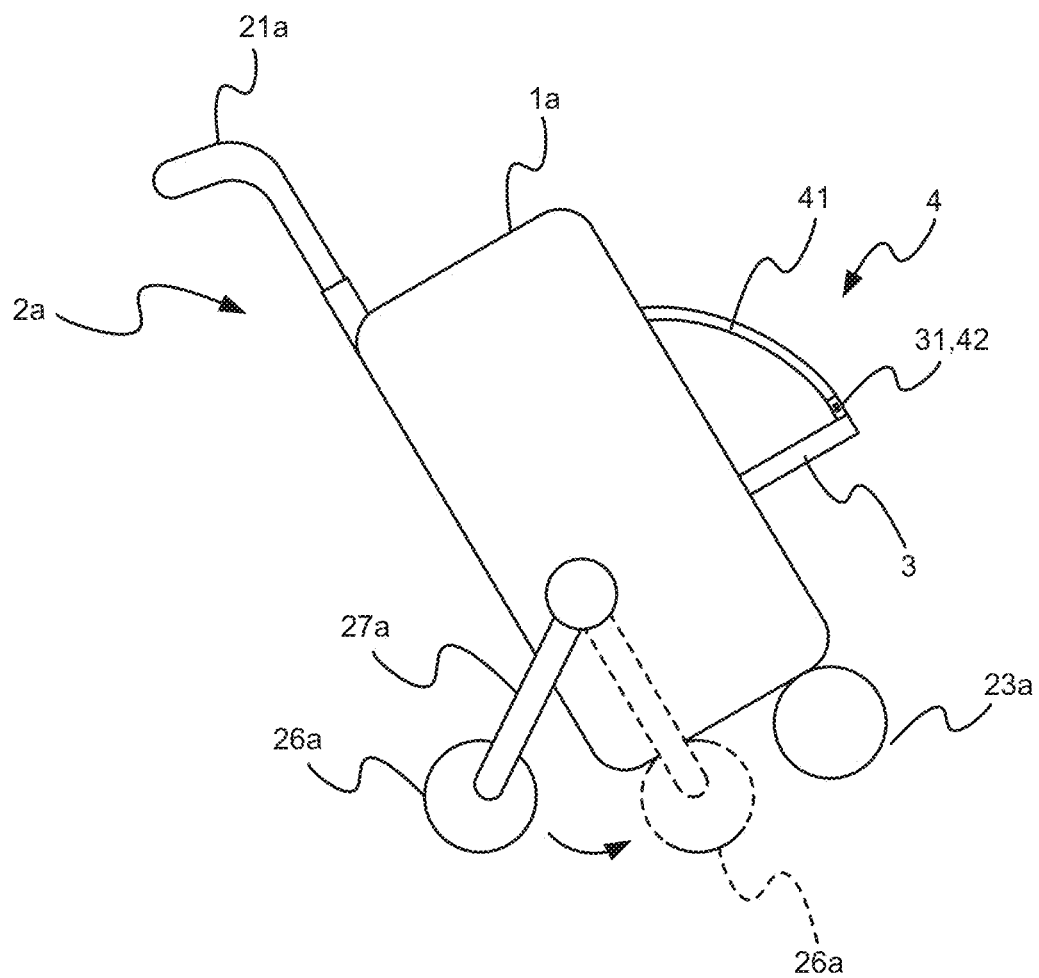
FIG. 5 is the view showing the fifth state-of-use of the second preferred embodiment.
Figure 6:
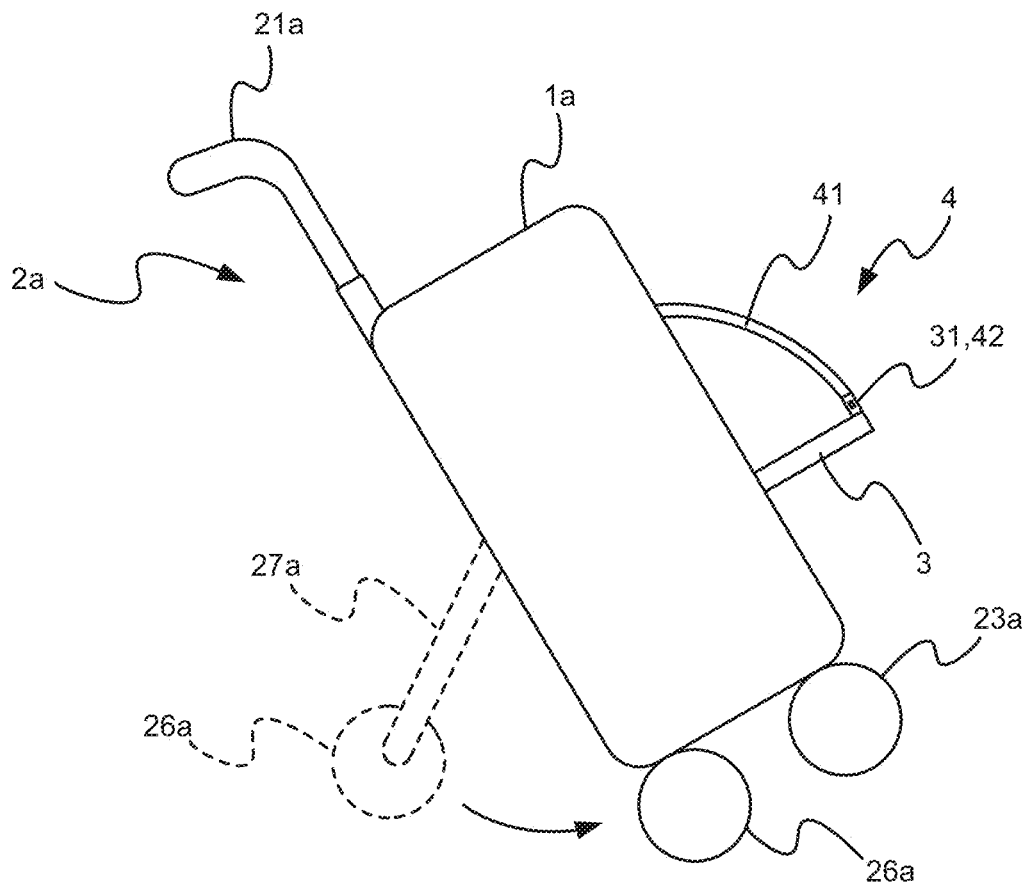
FIG. 6 is the view showing the sixth state-of-use of the second preferred embodiment.
Figure 7:
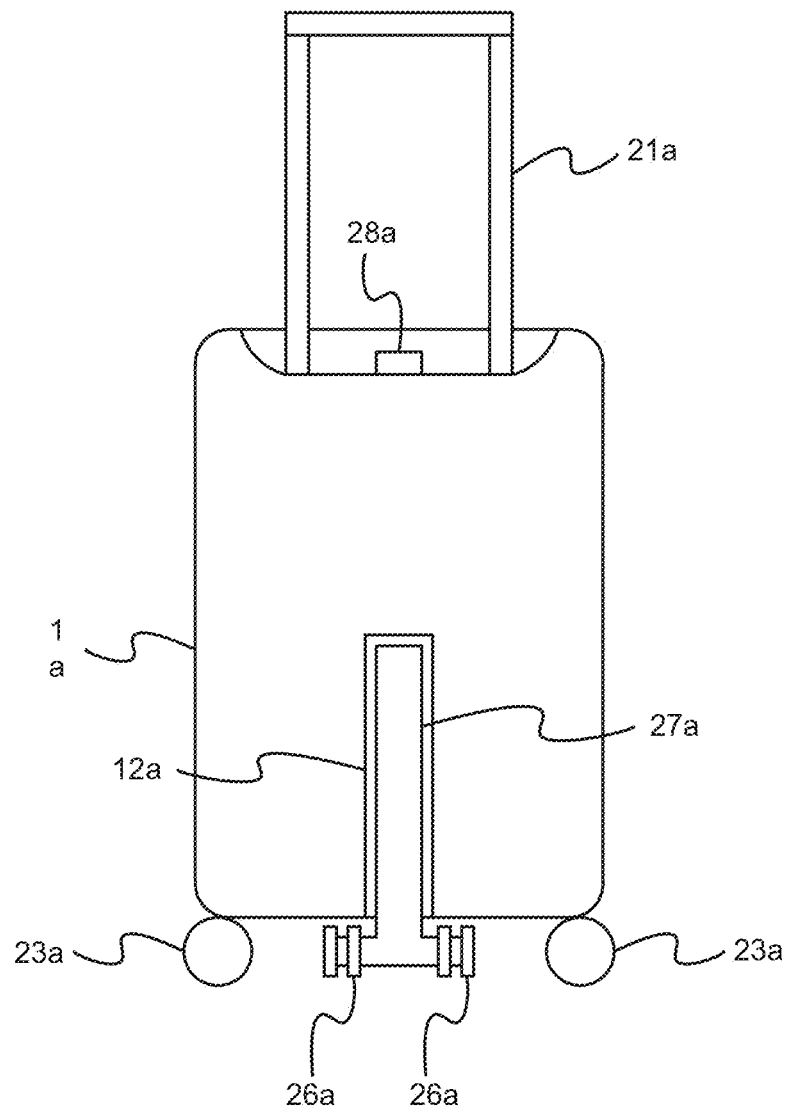
FIG. 7 is the rear view showing the sixth state-of-use.

Please further refer to FIG. 5 to FIG. 7, which are views showing a fifth and a sixth states-of-use of a second preferred embodiment and a rear view showing the sixth state-of-use of the second preferred embodiment. As shown in the figures, the present invention has a second preferred embodiment. The second preferred embodiment differs from the first preferred embodiment in that: the casing 1a is combined with a front wheel set 23a at bottom; the rod assembly 2a comprises a grasping part 21a and at least one auxiliary stand 27a; the grasping part 21a is capable of being inserted in and pulled out and is fixed at a rear surface of the casing 1a; top of the at least one auxiliary stand 27a is pivotally disposed on the casing 1a to be folded and disposed on the casing or to be extended out from the casing 1a; and the at least one auxiliary stand 27a is combined with a rear wheel set 26a at bottom.

In the fifth state-of-use, the at least one auxiliary stand 27a is pivotally connected to two sides of the casing 1a to be adhered on and extended from the casing 1a, as shown in FIG. 5.

In the sixth state-of-use, the casing 1a has a holding groove 12a concaved at the rear surface to correspondingly hold the at least one auxiliary stand 27a in the holding groove 12a. Besides, the casing 1a further has an actuating part 28a exposed out at the rear surface of the casing 1a; and a displacement unlocking can be done by depressing the actuating part 28a for pivoting so that the at least one auxiliary stand 27a is changed from being folded and held in the rear surface of the casing 1a into being extended and released from the rear surface of the casing 1a, as shown in FIG. 6 and FIG. 7.

Thus, the present invention designs an innovative structure for a luggage trunk stroller, comprising a casing, a rod assembly, a seat cushion and a seat belt. As comparing to the conventional structure, the casing can be manually pivoted for changing the tilt angle of the casing at 0~90 degrees and fastened at a certain position with the coordination of the rod assembly. When the casing is disposed at a certain angle, the seat cushion can be swayed and expanded for an infant to sit. Or, when the casing is disposed in a horizontal planar state, the seat cushion can be swayed and folded for the infant to lie flat. In this way, the luggage trunk stroller is able to carry the infant during walking. The luggage and the infant can be carried at the same time so that the added value of the luggage trunk stroller is effectively improved.

To sum up, the present invention is an adjustable luggage trunk stroller having a foldable seat, where a casing of the luggage trunk stroller can be manually pivoted for changing the tilt angle at 0~90 degrees and fastened at a certain position with the coordination of the rod assembly; when the casing is disposed at a certain angle, the seat cushion can be swayed and expanded for an infant to sit; when the casing is disposed in a horizontal planar state, the seat cushion can be swayed and folded for the infant to lie flat; and, thus, the luggage trunk stroller can carry the infant and the luggage at the same time during walking.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:
1. A luggage trunk stroller with a seat cushion comprising:
a casing combined with a front wheel set at a bottom of said casing;
a rod assembly comprising a grasping part and at least one auxiliary stand, wherein said grasping part is configured to be inserted in and pulled out and is arranged at a rear surface of said casing; a top of said at least one auxiliary stand is pivotally disposed on said casing to be moved in a way selected from a group consisting of being folded and being extended out from said casing; and said at least one auxiliary stand is combined with a rear wheel set at a bottom of said auxiliary stand;
a seat cushion pivotally connected to a front surface of the casing; and
a seat belt arranged on said front surface of said casing.
2. The luggage trunk stroller according to claim 1, wherein said at least one auxiliary stand is pivotally connected to two sides of said casing to be adhered on and extended from said casing.

3. The luggage trunk stroller according to claim 1, wherein said at least one auxiliary stand is pivotally connected to said rear surface of said casing to be adhered on and extended from said casing.

4. The luggage trunk stroller according to claim 3, wherein said casing has a holding groove concaved in said rear surface to hold said at least one auxiliary stand in said holding groove.

5. The luggage trunk stroller according to claim 1, wherein said casing has a holding depression concaved in said front surface of said casing and said seat cushion is configured to be folded into and to be held in said holding depression.

6. The luggage trunk stroller according to claim 1, wherein said seat cushion is configured to be folded to be held at the bottom of said casing.

7. The luggage trunk stroller according to claim 1, wherein, when said seat cushion is extended, said seat cushion has a first joint at a side of said seat cushion opposite to said casing; said seat belt comprises two straps and a second joint; first ends of said straps are separately fixed at two sides on said front surface of said casing; second ends of said straps are jointed to said second joint; and said second joint is capable of being removed and fixed at said first joint; and wherein said seat cushion, said front surface of said casing and said straps form a holding space by fixing said second joint to said first joint.

8. The luggage trunk stroller according to claim 1, wherein said casing further has two connecting parts at two corresponding opposite sides of said casing connected to said seat cushion; each said connecting part has a strap at a first end and a locking device at a second end of said connecting part; said belts of said connecting parts are in conjunction with and fixed at said sides of said casing separately; and said locking devices of said two connecting parts are detachably connected with each other.

* * * * *